Patented Aug. 19, 1947

2,426,011

UNITED STATES PATENT OFFICE 2,426,011

GLUCOSE BISULFITE COMPOUNDS OF ALKOXY AMINO PYRIDINE

Harris L. Friedman, New York, and Leo D. Braitberg, Yonkers, N. Y., assignors to Pyridium Corporation, Yonkers, N. Y., a corporation of New York No Drawing. Application October 19, 1945, Serial No. 623,432

4 Claims. (Cl. 260—211)

Our invention relates to and has for its object, new chemical compounds which are more stable than the original base and hence are useful as intermediates in the production of dyes and other compounds, and some of which have therapeutic properties and are useful for devitalizing bacteria and rendering them harmless or innocuous.

While the basic compounds from which we have formed the new therapeutic compounds of our invention have therapeutic properties, their physical and chemical properties are such as to render their proper application somewhat difficult and they require considerable care in their successful application.

These basic compounds are generally oily liquids, or low melting solids, practically insoluble in water and are somewhat unstable, coloring upon standing, and the decomposition product may be toxic and deleterious, and their acid salts are generally too acid for injection purposes.

One of the objects of our invention, therefore, is to produce new compounds which, while possessing therapeutic properties, will have none of the mentioned, and other disadvantages of the corresponding basic compounds.

We have found that the alkali glucose bisulfite salts of these basic compounds possess highly therapeutic values over those of their corresponding basic compounds.

These therapeutic compounds of our invention are stable preparations and hence they can be administered in combination with food, in capsules, in tablet form, or parenterally injected in the form of a solution, and they, therefore, possess highly valuable physical, stable and administrative properties over their corresponding basic compounds.

We have found further, that these therapeutic compounds of our invention are particularly valuable in their effectiveness against *Mycobacterium tuberculosis*, although their usefulness is not limited to that particular disease, and that this effectiveness in the treatment of disease is greater than that possessed by the corresponding basic compounds.

We have found, further, that these therapeutic compounds of our invention are less toxic than the corresponding basic compounds, and that they also possess the additional unexpected property of being practically unaffected in their anti-bacterial action in the presence of such biological inhibitory substances as p-aminobenzoic acid, peptones, serum, pus, etc., which are present in living organisms, which substances seriously reduce the effectiveness of other compounds.

This action of these therapeutic compounds of our invention against *Mycobacterium tuberculosis* is particularly unexpected and remarkable as they are relatively without effect against other pathogenic organisms such as *E. coli, Staphylococcus aureus* and *Streptcoccus pyogenes*.

Further, substances which were hitherto known to have activity against *Mycobacterium tuberculosis*, such as certain sulfonamide and related compounds, are greatly, if not completely, inhibited in the presence of biological inhibitory substances, which is known to account for the lack of sufficient tuberculosis activity of those previously known compounds.

Some of the inhibitory substances which are present in the human organism include para-aminobenzoic acid, serum, peptones, pus and other protein degradation products which have high content of inhibitory substances. Some of these inhibitory substances in the lesions of tuberculosis and other diseases, which produce large amounts of tissue break-down, play a very important role in the inhibition of sulfonamide and sulfone compounds, and as a result of this inhibitory mechanism, therapeutic trials on the whole failed.

The activity of therapeutic compounds of our invention against *Mycobacterium tuberculosis* is not diminished when p-aminobenzoic acid, peptones, serum, pus, etc., are present. We have found that these compounds of our invention inhibit the growth of various strains of tuberculosis organisms in various dilutions, some diluted as high as one part to 25 million, depending upon the medium and strain of tuberculosis organism used.

As these inhibitory substances are present in the tubercular host, it is impossible to produce the desired therapeutic effect with sulfonamide and sulfone compounds, and hence any compounds which would practically retain their bacteriostatic properties irrespective of the inhibitory substances present would be of the highest value.

This property of the therapeutic compounds included within our invention of being practically uninhibited in bacteriostatic effectiveness, and especially in bacteriostatic effect against *Mycobacterium tuberculosis*, is entirely unexpected and cannot be predicated upon any prior knowledge relative to previously known bacteriostatic compounds, and is of the greatest importance and value in the treatment of infection.

By "inhibitory substances" in our specification and claims, we mean those substances which prevent the bacteriostatic action normally manifested by compounds in their absence, but which do not inhibit the bacteriostatic activities of the therapeutic compounds of our invention.

We have found that when adequate precautions are taken to administer our compounds in such a manner and with such frequency as to insure a desired concentration of the respective compounds in the blood stream, they are effective in the treatment of tuberculosis.

Another advantage of the compounds of our invention is that following administration by whatever route chosen, concentration of the respective compounds in the blood of the recipient animals are higher and can be maintained with greater safety than is possible with the corresponding basic compounds.

The probable general formula of the compounds of our invention is

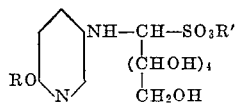

in which R represents a saturated or unsaturated alkyl radical with not more than eight carbon atoms such as ethyl-, propyl-, butyl-, amyl-, hexyl-, heptyl-, octyl-, isopropyl-, isobutyl-, secondary butyl-, tertiary butyl-, isoamyl-, diethylmethyl-, dipropylmethyl-, allyl-, methoxyethyl-, ethoxyethyl-, and butoxyethyl-, or saturated and unsaturated aryl radicals such as phenyl-, napthyl-, benzyl-, betapyridyl-, furfuryl-, p-aminophenyl-, p-aminobenzyl-, cyclohexyl-, tetrahydrofurfuryl-, phenyloxyethyl-, and benzyloxyethyl-, and R' is hydrogen or an alkali metal.

The general formula for the basic compounds from which we produce the compounds of our invention is

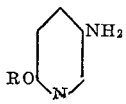

in which R represents a saturated or unsaturated alkyl radical with not more than eight carbon atoms, or a saturated or unsaturated aryl radical.

In producing our new compounds we react the free amine with an aqueous solution of glucose and an alkali metal bisulfite, such as sodium bisulfite or potassium bisulfite. After the reaction is completed, no free amine can be detected by the usual tests. The product so formed is in solution and the strength of the solution can be regulated by adding the required amount of water.

The following examples of our processes for the production of the indicated compounds of our invention.

*Example I*

3.5 grams of glucose and 1.3 grams of sodium bisulfite were dissolved in 4 ccs. of distilled water and 1.38 grams of 2-ethoxy, 5-aminopyridine were added. After boiling a few minutes, all the amine has gone in solution forming the new compound, 2-ethoxy, 5-aminopyridine sodium glucose bisulfite.

*Example II*

16.4 grams of glucose and 6.3 grams of sodium bisulfite were dissolved in 20 ccs. of distilled water and heated up to boil. While boiling 8.3 grams of 2-butoxy, 5-aminopyridine were added. After boiling for 12 minutes all the amine has gone into the solution. The solution was concentrated in a vacuum desiccator to a heavy syrup, then dried at 75–80° C. and placed into a vacuum desiccator again. The new product, 2-butoxy, 5-aminopyridine sodium glucose bisulfite forms a pinkish white powder and is very hygroscopic.

*Example III*

7.0 grams of glucose and 2.6 grams of sodium bisulfite were dissolved in 6 ccs. of distilled water and heated up to boil. 3.4 grams of 2-hexyloxy, 5-aminopyridine were added to the boiling solution and after all the amine was dissolved, the solution was concentrated and placed into a drying oven at 75° C. overnight. Then it was dried at 100° C. for 2 hours and placed in a vacuum desiccator. The resulting product, 2-hexyloxy, 5-aminopyridine sodium glucose bisulfite forms a cream colored powder.

*Example IV*

3.5 grams of glucose and 1.3 grams of sodium bisulfite were dissolved in 4 ccs. of distilled water and then 1.8 grams of 2-isoamyloxy, 5-aminopyridine were added. The mixture was warmed for a few minutes in a water bath, when solution to a clear, light-amber colored liquid resulted, which gave no free amine test. The solution contained the new compound, 2-isoamyloxy, 5-aminopyridine sodium glucose bisulfite.

*Example V*

2.5 grams of glucose and 1.7 grams sodium bisulfite were dissolved in 5 ccs. of distilled water and then 2.0 grams of 2-allyloxy, 5-aminopyridine were added. The mixture was digested on a steam bath and a turbid solution resulted. After cooling the turbid mixture was extracted 3 times with ether to remove traces of unreacted amine. The aqueous solution was filtered with the addition of filter-aid and now contained the resulting product, 2-allyloxy, 5-aminopyridine sodium glucose bisulfite.

*Example VI*

2.4 grams of 2-methoxyethoxy, 5-aminopyridine hydrochloride were neutralized with caustic soda and the free amine extracted with ether. The ether was evaporated and the free amine was added to a solution of 3.98 grams of glucose and 2.1 grams sodium bisulfite in 15 ccs. of distilled water. The reaction mixture was then heated until all the amine was dissolved, and no more free amine could be detected. The product so formed is 2-methoxy-ethoxy, 5-aminopyridine sodium glucose bisulfite.

*Example VII*

3.7 grams of 2-phenyloxy, 5-aminopyridine were added to a solution of 7.2 grams of glucose and 4.5 grams of sodium bisulfite in 5 ccs. of distilled water. The reaction mixture was heated on a steam bath until a complete solution was obtained. The syrupy solution was then diluted with water to 20 ccs. The resulting product is 2-phenyloxy, 5-aminopyridine sodium glucose bisulfite.

*Example VIII*

7.96 grams of glucose and 4.2 grams of sodium bisulfite were dissolved in 20 ccs. of water. 4.0 grams of 2-tetrahydrofurfuryloxy, 5-aminopyridine were added to this solution and the reaction mixture was refluxed for one and a half hours, when complete solution was obtained. The solution gave no reaction for free amine and contained the new product, 2-tetrahydrofurfuryloxy, 5-aminopyridine sodium glucose bisulfite.

The products formed as described in the foregoing examples are similar in their characteristics. They are extremely soluble in water, even hygroscopic, therefore, most of them are difficult to isolate and to crystallize. That the reaction is completed and there is no free amine present, is proven in each case by a test for free amine. To insure this glucose and sodium bisulfite is used in excess quantity. As these two chemicals are inert, and non-toxic, they may remain in the solution without influencing the activity of our products.

The activity of some of the compounds included in our invention against *Mycobacterium tuberculosis* are tabulated below. The figures indicate the highest dilution that still inhibits the growth of *Mycobacterium tuberculosis* under a particular set of experimental conditions as regards inoculum, culture, etc., thereby making a comparable series.

| Name of compound | Highest dilution showing bacteriostasis |
| --- | --- |
| 2-ethoxy, 5-aminopyridine sodium glucose bisulfite | 1/3,125 |
| 2-butoxy, 5-aminopyridine sodium glucose bisulfite | 1/800,000 |
| 2-hexyloxy, 5-aminopyridine sodium glucose bisulfite | 1/1,600,000 |
| 2-isoamyloxy, 5-aminopyridine sodium glucose bisulfite | 1/50,000 |
| 2-allyloxy, 5-aminopyridine sodium glucose bisulfite | 1/1,600,000 |
| 2-methoxyethoxy, 5-aminopyridine sodium glucose bisulfite | 1/25,000 |
| 2-phenyloxy, 5-aminopyridine sodium glucose bisulfite | 1/1,563 |
| 2-tetrahydrofurfuryloxy, 5-aminopyridine sodium glucose bisulfite | 1/3,125 |

The therapeutic compounds of our invention, therefore, present highly valuable and unexpected bacteriostatic properties especially against such bacteria as cause tubercular infections, although their usefulness is not limited to that particular disease.

We do not limit ourselves to the specific limitations mentioned, as these are given solely for the purpose of clearly describing our invention as set forth herein.

What we claim is:

1. Compounds having the general formula:

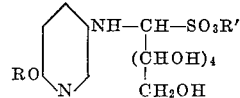

in which R is a member selected from the group consisting of monovalent radicals derived from an aliphatic hydrocarbon having not more than eight carbon atoms and in which R' is a member selected from the group consisting of hydrogen and alkali metals.

2. 2-butoxy, 5-aminopyridine sodium glucose bisulfite.

3. 2-hexyloxy, 5-aminopyridine sodium glucose bisulfite.

4. 2-allyloxy, 5-aminopyridine sodium glucose bisulfite.

HARRIS L. FRIEDMAN.
LEO D. BRAITBERG.